(12) United States Patent
De Oliveira Kastrup Pereira

(10) Patent No.: US 7,260,709 B2
(45) Date of Patent: Aug. 21, 2007

(54) PROCESSING METHOD AND APPARATUS FOR IMPLEMENTING SYSTOLIC ARRAYS

(75) Inventor: Bernardo De Oliveira Kastrup Pereira, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 272 days.

(21) Appl. No.: 10/511,504

(22) PCT Filed: Apr. 1, 2003

(86) PCT No.: PCT/IB03/01187

§ 371 (c)(1),
(2), (4) Date: Oct. 14, 2004

(87) PCT Pub. No.: WO03/092171

PCT Pub. Date: Nov. 6, 2003

(65) Prior Publication Data

US 2005/0166034 A1 Jul. 28, 2005

(30) Foreign Application Priority Data

Apr. 25, 2002 (EP) .................................. 02076649

(51) Int. Cl.
*G06F 12/00* (2006.01)
(52) U.S. Cl. .......................... 712/225; 712/19; 712/24; 711/170
(58) Field of Classification Search .................. 712/19, 712/225, 24; 711/170
See application file for complete search history.

(56) References Cited

U.S. PATENT DOCUMENTS

| 5,046,000 | A | | 9/1991 | Hsu |
|---|---|---|---|---|
| 5,295,252 | A | | 3/1994 | Torii |
| 5,933,855 | A | * | 8/1999 | Rubinstein .................. 711/200 |
| 6,631,455 | B1 | * | 10/2003 | Raza et al. .................. 711/170 |
| 6,836,809 | B2 | * | 12/2004 | Bace ............................ 710/57 |
| 6,907,479 | B2 | * | 6/2005 | Karnstedt et al. ............. 710/52 |

FOREIGN PATENT DOCUMENTS

| EP | 0717347 A2 | 6/1996 |
|---|---|---|
| EP | 0729106 A1 | 8/1996 |

OTHER PUBLICATIONS

Emilio L. Zapata, "A VLSI Constant Geometry Architecture for the Fast Hartley and Fourier Transforms", 8354 IEEE Transactions on Parallel and Distributed Systems, Jan. 1992, No. 1, NY.
J. Kang Van Der Werf et al., "Mapping Array Communication onto FIFO Communication-Towards an Implementation", Proceedings 13th Int'l Symposium on Systems Synthesis, pp. 207-213, Published: Los Angeles, CA.

* cited by examiner

*Primary Examiner*—William M. Treat
(74) *Attorney, Agent, or Firm*—Paul Im

(57) ABSTRACT

The present invention relates to a processing method and apparatus for implementing a systolic-array-like structure. Input data are stored in a depth-configurable register means (DCF) in a predetermined sequence, and are supplied to a processing means (FU) for processing said input data based on control signals generated from instruction data, wherein the depth of the register means (DCF) is controlled in accordance with the instruction data. Thereby, systolic arrays can be mapped onto a programmable processor, e.g. a VLIW processor, without the need for explicitly issuing operations to implement the register moves that constitute the delay lines of the array.

9 Claims, 2 Drawing Sheets

PROCESSING METHOD AND APPARATUS FOR IMPLEMENTING SYSTOLIC ARRAYS

The present invention relates to a processing method and apparatus, especially a scaleable VLIW (Very Large Instruction Word) processor or a coarse-grained reconfigurable processor for implementing systolic-array-like structures.

Programmable or configurable processors are pre-fabricated devices that can be customised after fabrication to perform a specific function based on instructions or configurations, respectively, issued to it. These instructions or configurations, when executed in the processor, control the processor resources (e.g. arithmetic logic unit (ALU), register file, interconnection, memory, etc.) to perform certain operations in time (i.e. sequentially) or space (i.e. in parallel). Typically, configurable processors will perform more operations in space than programmable processors, while programmable processors will perform more operations in time than configurable processors.

An algorithm-to-silicon design methodology for digital signal processors (DSP) has been developed, which allows for an enormous increase in design productivity of a DSP designer and a more optimised design of the resulting chip. The methodology initially involves capturing an algorithm in an implementation-independent way. Then, with the help of a set of evaluators and analysers, the algorithm can be tuned and optimised for a fixed-point implementation. Once a satisfactory behaviour is reached, a set of interactive synthesis engines can be applied to map the fixed-point specification to a target VLIW-like architecture. This mapping process is very flexible and fast, which makes it possible to try out many alternatives in a very short time. In general, a very large instance of such a VLIW-like processor architecture can be seen as a coarse-grained reconfigurable processor, in which each control word in its micro-code memory is a configuration. This interpretation is possible due to the size of the corresponding VLIW instruction, which allows for many parallel operations to be performed, therefore largely computing in space.

VLIW processors are used to exploit the available Instruction Level Parallelism (ILP) in an application. To exploit the ILP, data-independent operations are scheduled concurrently in a VLIW instruction.

FIG. 1 shows a schematic diagram indicating a processing application and a corresponding programmable processor structure of an application, where a data-flow graph representing a loop body is shown on the left side. In FIG. 1, circles 20 represent operations, and arrows represent data dependencies between operations. Dashed arrows represent input or output values respectively consumed or produced in a loop iteration. On the right-hand side, a 4-issue slot VLIW processor 10 is depicted, comprising four ALUs A1 to A4 and four issue slots I1 to I4 for controlling the operation of the ALUs A1 to A4. In the present case, the VLIW processor 10 can compute one iteration of the indicated loop processing application in five cycles, executing a sequence of two, four, two, one, and one operation(s) in each cycle, respectively. The number of operations per cycle depends on the number of operations which can be processed concurrently or in parallel, i.e. shown within one horizontal line of the processing application. The partial area 30 of the processing application illustrates the situation in the second cycle, in which four operations are executed in parallel, in one cycle of the VLIW processor 10.

Note that ILP is exploited within the loop body for a single iteration of the loop. Techniques of software pipelining can be used to exploit ILP across loop iterations, but those are typically difficult to implement and are mostly effective only for very simple and small loops, e.g. single basic blocks.

Custom hardware, however, can overlap the execution of every iteration of a loop, keeping most computing resources busy at all cycles. This kind of implementation exploits data locality and pipelining to the extreme. It is known as systolic arrays. FIG. 2 shows a schematic diagram indicating a systolic array implementation of the final two taps of a digital filter application, e.g. an FIR (Finite Impulse response) filter which can generate an output sample at every cycle. The grey blocks are clocked registers R. All function units FU are also busy at every cycle. Input data i is processed locally as it goes down the "pipe" to the right to generate output data o, as in a "pulsating" assembly line. The line acc contains partial accumulations. Registers c contain coefficients to the multipliers. Therefore, this architecture is called "systolic" array. Systolic arrays allow for very high exploitation of parallelism, obtaining high throughput.

In Zapata et al, "A VLSI constant geometry architecture for the fast Hartley and Fourier transforms", IEEE Transactions on Parallel and Distributed Systems, Vol. 3, No. 1, pp. 58–70, Jan. 1992, an organization of a processor memory is based on first-in-first-out (FIFO) queues to facilitate a systolic data flow and to permit implementation in a direct way of complex data movements and address sequences of the transforms. This is accomplished by means of simple multiplexing operations, using hardware control.

Hence, it is, in principle, possible to map systolic arrays onto a VLIW processor. Then, each function unit FU in the systolic array will correspond to an equivalent unit (e.g. ALU, multiplier, MAC, etc.) in the VLIW processor and will be allocated one issue slot. For the systolic array of FIG. 2, four issue slots would be required in the VLIW processor for the four function units FU. In addition, one register move unit would be required in the VLIW processor for each register move corresponding to a delay line in the systolic array, with its corresponding issue slot. In the systolic array of FIG. 2, seven register moves that correspond to delay lines are provided. Therefore, seven register move units would be required in the VLIW processor, with their additional seven issue slots. This way, there would be more issue slots and, therefore, control signals and associated circuitry, corresponding to register moves than to actual operations. Also, the need for the move units to access the same registers that need to be accessed by other function units, introduces architectural complications in the VLIW design. All this renders the VLIW implementation of systolic arrays impractical. In this respect, it is noted that, in the original systolic array, register moves are encoded in space, by means of FIFO lines of registers that can implement the delay lines without any explicit control.

It is an object of the present invention to enable implementation of systolic array structures by a programmable processor.

This object is achieved by a processing apparatus as claimed in claim 1 and by a processing method as claimed in claim 8.

Accordingly, a programmable processor template for implementing systolic arrays can be achieved by providing a depth-configurable register means at the input of the processing units. Due to the possible implementation of systolic array structures by programmable processors, e.g. VLIW processors, hardware-like performance, mainly throughput, can be provided for media intensive applications, like video streaming, while preserving the flexibility and programmability of a well-known processor paradigm. It could even be possible to get a compiler to automatically generate "systolic array-like" instruction schedules, without need for explicit hardware design. Compilation technology could be extended in this direction.

Thus, a cost-effective VLIW template can be provided for the mapping of systolic structures. This template considerably reduces the overhead created by the current need to explicitly control all register move operations corresponding to delay lines.

Preferably, the register means may comprise distributed register files provided at each input terminal of a plurality of functional units of the processing means. In particular, the distributed register files may comprise depth-configurable FIFO register files addressable for individual registers. The number of physical registers available is fixed by the hardware. Then, the register control means may be arranged to determine the last logical register of the FIFO register files based on control signals derived from the instruction data.

Furthermore, at least one issue slot may be provided for storing the instruction data. The register control means may be arranged to use a part of the bit pattern of the instruction data stored in the at least one issue slot for controlling the depth of the register means.

Other advantageous further developments are defined in the dependent claims.

In the following, the present invention will be described on the basis of a preferred embodiment with reference to the accompanying drawings in which.

The preferred embodiment will now be described on the basis of a VLIW processor architecture.

Figure 1:
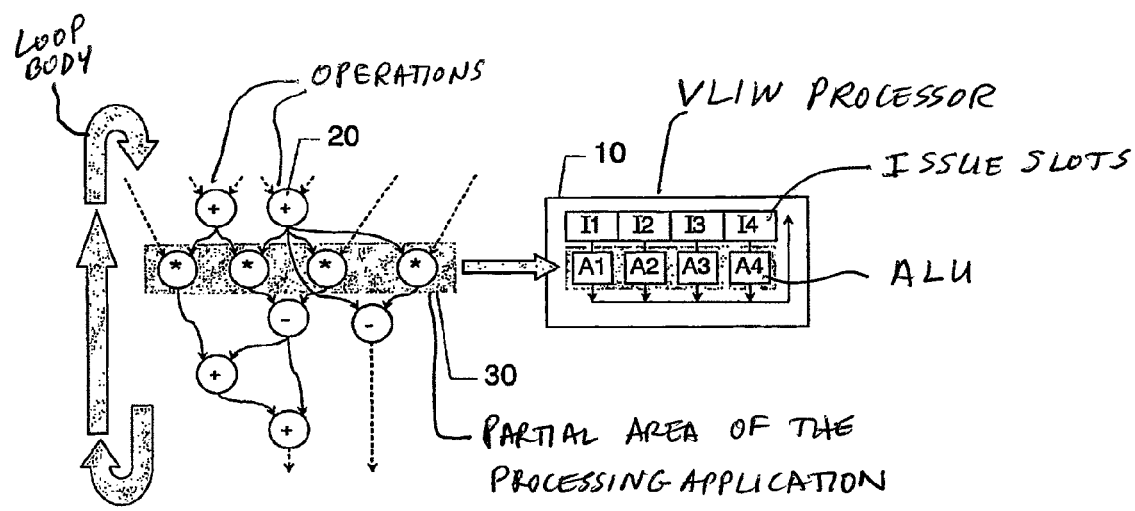
FIG. 1 shows a schematic diagram of a processing application and a corresponding programmable processor structure.
Figure 2:
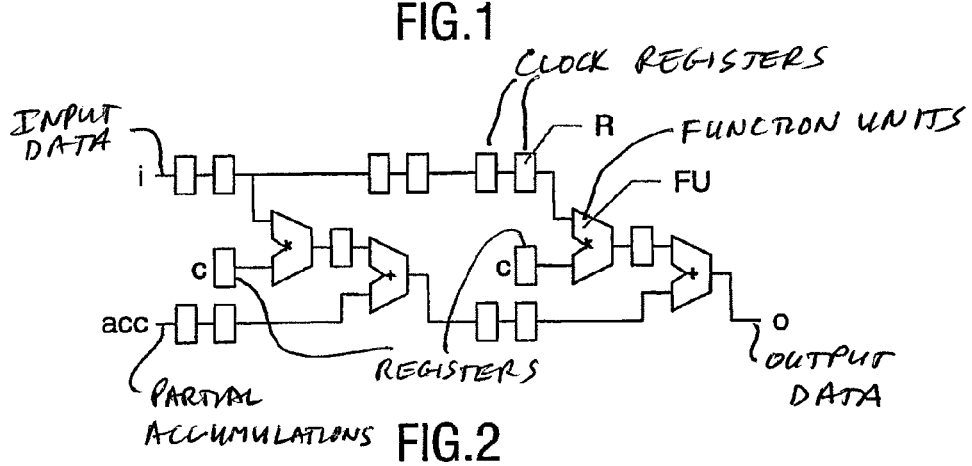
FIG. 2 shows a schematic diagram of a systolic array architecture.
Figure 3:
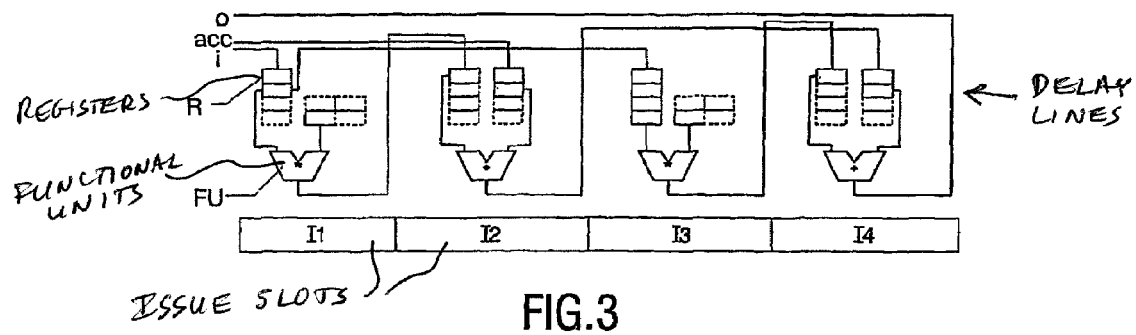
FIG. 3 shows a principle architecture for implementing the systolic array architecture of FIG. 2 in a programmable processor according to the present invention.

In FIG. 3, the systolic array of FIG. 2 is restructured to enable its implementation in a VLIW architecture. Issue slots I1 to I4 are made explicit, and first-in-first-out (FIFO) delay lines comprising registers R are preserved at the input terminals of functional units FU, e.g. ALUs. Dotted boxes represent physical registers available in the hardware but not used in the shown systolic configuration. Drawn this way, the scheme suggests a VLIW template that can efficiently map systolic structures. The intuitive concept illustrated in FIG. 3 can be generalised by providing distributed register files at each input of the functional units FU.

Figure 4:
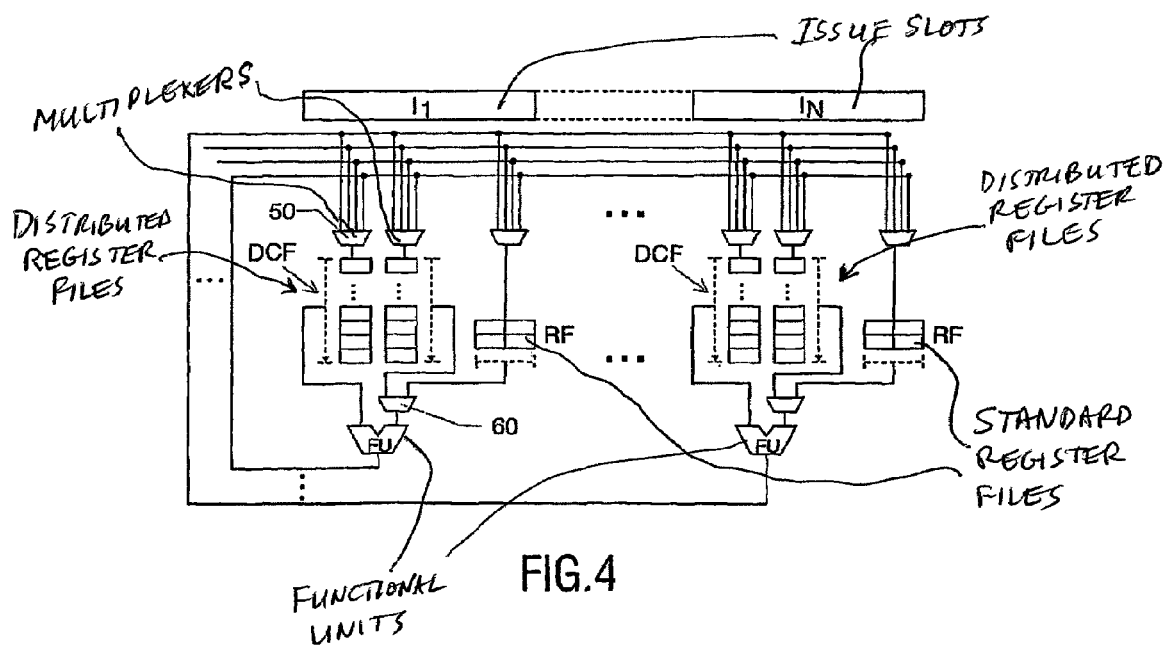
FIG. 4 shows a programmable processor architecture according to the preferred embodiment for implementing systolic arrays.

FIG. 4 illustrates a programmable processor architecture according to the preferred embodiment as a VLIW template which can efficiently map systolic structures. In particular, distributed register files DCF are provided, one for each input of each function unit FU. Additionally, an interconnect network consisting of several point-to-point lines is provided and connected to the respective inputs of the functional units by input or output multiplexers 50. Thereby, the point-to-point lines can be written to by a single predetermined function unit FU. Although FIG. 4 suggests full connectivity, the interconnection bus does not need to be fully connected. Furthermore, each input of a functional unit FU can be connected to a standard register file RF, addressable for individual registers. Note that in FIG. 4, for simplicity, only the right one of the inputs of each functional unit FU is shown connected to a respective standard register file RF. Register files with multiple read and/or write ports are also possible.

Due to the fact that the template does not include any centralised structure, i.e. all resources are distributed, it is scaleable, allowing for very high number of issue slots potentially needed by large systolic arrays, e.g. a 16-tap FIR filter or a large matrix multiplier.

According to the preferred embodiment, a depth-configurable register file DCF is arranged at each input of each function unit FU. The depth-configurable register files DCF may be implemented by FIFO memories whose last logical register can be determined by control signals. However, any other addressable or controllable memory or register structure capable of determining a last logical storage position in a delay line based on control or address signals can be used for implementing the depth-configurable register files DCF.

For a depth-configurable FIFO of N physical registers, the output of the FIFO can be programmed to be at register N, N−1, N−2, ... 1. By controlling the depth of the FIFO, we can control the number of delay lines it emulates. In FIG. 3, for instance, if the leftmost FIFO had 4 physical registers R, the leftmost depth-controlled register file DCF of FIG. 4 would be controlled by the control signal at the leftmost issue slot I1 so as to place its output terminal at the second register (N−2, N=4), while the lower two registers (N,N−1) remain unused. Thus, the control signals controlling the depth of the depth-controlled register files DCF are part of the bit patterns in the corresponding issue slots I1 to I4.

In summary, a programmable processor template for implementing systolic arrays can be achieved by providing a depth-configurable memory or register file DCF at the input terminals of each function unit FU. The depth of the depth-configurable register file DCF is controlled e.g. by respective bits loaded in the corresponding issue slot. With this augmentation, systolic arrays can now be mapped onto a programmable processor, e.g. a VLIW processor, without the need for explicitly issuing operations to implement the register moves that constitute the delay lines of the array. The proposed template can be configured to implement a variety of systolic arrays. It provides for a coarse-grained reconfigurable fabric that allows for hardware-like data throughput, at the same time that it preserves the programmability of a processor.

It is to be noted that the present invention is not restricted to the preferred embodiment but can be used in any programmable or reconfigurable data processing architecture so as to implement systolic or other pipeline architectures.

The invention claimed is:

1. A processing apparatus for implementing a systolic-array-like structure, said apparatus comprising:
    a) input means for inputting data;
    b) register means for storing said input data in a predetermined sequence;
    c) processing means for processing data received from said register means based on control signals generated from instruction data; and
    d) register control means for controlling the depth of said register means in accordance with said instruction data; wherein said register means comprises distributed register files provided at input terminals of a plurality of functional units of said processing means; and wherein said distributed register files comprise depth-configurable FIFO register files addressable for individual registers.

2. An apparatus according to claim 1, wherein said register control means are arranged to determine the last logical register of said FIFO register files based on control signals derived from said instruction data.

3. An apparatus according to claim 1, further comprising at least one issue slot for storing said instruction data.

4. An apparatus according to claim 3, wherein said register control means are arranged to use a part of the bit pattern of said instruction data stored in said at least one issue slot for controlling said depth of said register means.

5. An apparatus according to claim 1, wherein said programmable processing apparatus is a scalable VLTW processor or a coarse-grained reconfigurable processor.

6. An apparatus according to claim 1, wherein said distributed register files are connected to an interconnect network made up of a plurality of point-to-point connection lines.

7. An apparatus according to claim 6, wherein said point-to-point interconnect lines have a single source.

8. An apparatus according to claim 6, wherein said interconnect network is partially connected.

9. A processing method for implementing a systolic-array-like structure, said method comprising:
   a) storing input data in a register file in predetermined sequence;
   b) processing data received from said register file based on control signals generated from instruction data;
   c) controlling the depth of said register file in accordance with said instruction data;
   d) providing said register file with distributed register files at input terminals of a plurality of functional units; and
   e) providing said distributed register files with depth-configurable FIFO register files addressable for individual registers.

* * * * *